March 5, 1963 R. W. ROBERTS ETAL 3,080,486

BISTABLE AMPLIFIER CIRCUIT

Filed Dec. 22, 1958

WITNESSES

Edwin E. Bassler

Myron E. Click

INVENTORS
Roland W. Roberts, John Rosa,
Vidal R. Algazi & Harry J. Abrams
BY
F. E. Browder
ATTORNEY 3,080,486

BISTABLE AMPLIFIER CIRCUIT

Roland W. Roberts, John Rosa, and Vidal R. Algazi, Pittsburgh, and Harry J. Abrams, Monroeville, Pa., assignors to Westinghouse Electric Corporation, East Pittsburgh, Pa., a corporation of Pennsylvania Filed Dec. 22, 1958, Ser. No. 782,017
17 Claims. (Cl. 307—88)

Figure 1:
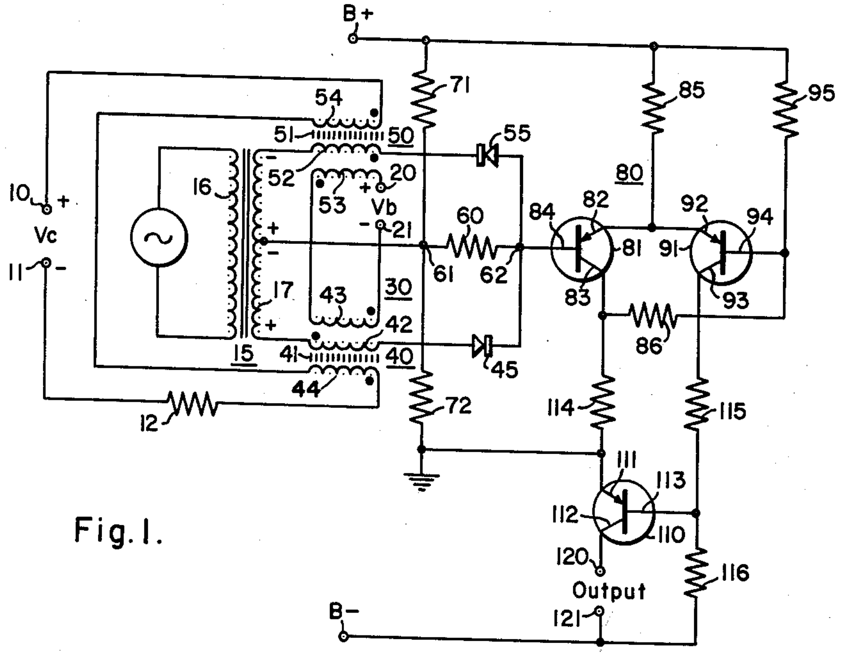

This invention relates to bistable circuits in general, and in particular to sensitive bistable circuits which can be turned "on" or "off" by short duration pulse inputs.

Electrical bistable devices have been in use in the industry for quite a number of years. The common definition of a bistable device is a device in which the output changes abruptly from a first state to a second state at certain values of input signals. Quite a number of these bistable devices have been developed for particular uses including the Schmidt trigger, the Eccles-Jordan flip-flop, and various self-saturating magnetic amplifiers with large amounts of positive feedback. The invention as hereinafter described is the combination of certain well-known magnetic amplifier circuits having a pulse type output with any of a variety of transistor flip-flop or "trigger" circuits, whch can be turned "on" or "off" by short duration pulse inputs. The magnetic amplifier may be of the "push-pull" type and have a reversible output turning the flip-flop both "on" and "off." A single sided magnetic amplifier having a pulse type output may also be used with arrangements for applying a reset signal to the transistor flip-flop.

The advantages of this invention over previously used circuits are multiple. Full control over the output of the device is obtained by a minute change in the control signal to the magnetic amplifier. Generally, in a magnetic amplifier, it is power or average output which is of interest. However, when a magnetic amplifier, as described above, is combined with a transistor flip-flop, as described in this invention, it is the peak value of the output of the magnetic amplifier which is of importance and not its duration. This output may be in the form of a short pulse of very small power and average content, as given by presently available square hysteresis loop magnetic core materials, but nevertheless its existence determines the operation of the transistor flip-flop output device. In general, this means that a small fraction of the power normally required for full control of the magnetic amplifier is required to change, from "on" to "off," for example, the bistable circuit output.

In all magnetic bistables, the speed of response is related to the "loopwidth" and a very narrow loopwidth can be achieved usually only at the expense of a very slow response because of the use of positive feedback resulting in theoretically infinite gain. The "loopwidth" is that range of input signals covering the portion of a bistable magnetic amplifier characteristic where the magnetic amplifier is in one of two stable output states depending upon the previous values or history of the input signal. In the invention described herein, this loopwidth is determined by the gain of the magnetic amplifier used and can be very narrow. The speed of response therefore of the entire bistable device herein described is the result of the combined speeds of response of the magnetic amplifier and the transistor flip-flop, which response can be designed to be very fast and very sensitive.

The loopwidth can be adjusted by changing the gain of the amplifier driver or by using the output of the device described herein to supply an adjustable bias to the magnetic amplifier driver.

The invention described herein takes advantage of the very efficient control of power by transistors used in the switching mode and realizes a considerable reduction in space in comparison with the "all magnetic bistable" with the same power handling capability.

It is an object of this invention to provide an improved bistable circuit device.

It is another object of this invention to provide a bistable device which is very sensitive, has a fast speed of response, and requires less space than prior art circuits.

It is a further object of this invention to provide an improved bistable magnetic-transistor circuit.

Further objects of this invention will become apparent when the following description is taken in conjunction with the accompanying drawings. In said drawings, for illustrative purposes only, are shown preferred embodiments of this invention.

In the drawings the manner in which the windings have been wound upon their associated saturable magnetic cores has been denoted by the polarity dot convention. That is, current flowing into the polarity dot end of a winding will drive the associated core toward positive saturation. Current flowing out of the polarity dot end of a winding will drive the associated core away from positive saturation.

Figure 2:
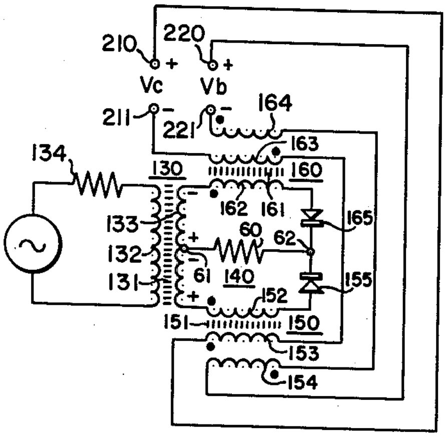

FIGURE 1 is a schematic diagram of a bistable circuit device embodying the teachings of this invention; and FIG. 2 is a schematic diagram of a single sided magnetic amplifier which may be utilized in a second embodiment of this invention.

Referring to FIG. 1, there is shown a bistable circuit apparatus which comprises, in general, a push-pull amplifier 30 connected to turn a transistor flip-flop 80 "on" and "off."

The amplifier 30 comprises two magnetic amplifiers 40 and 50. The magnetic amplifier 40 comprises a saturable magnetic core 41 having inductively disposed thereon a load or gating winding 42, a bias winding 43 and a control winding 44. The magnetic amplifier 50 comprises a saturable magnetic core 51 having inductively disposed thereon a gating or load winding 52, a bias winding 53 and a control winding 54.

A transformer 15 having a primary winding 16 and a center tapped secondary winding 17 is connected to drive the gating circuits of the magnetic amplifiers 40 and 50. The load or gating circuit for the magnetic amplifier 40 comprises one-half of the center tap secondary winding 17, the gating winding 42, a gating rectifier 45, a terminal 62, a load resistor 60, and a terminal 61 connected in series. The load or gating circuit for the magnetic amplifier 50 comprises the other half of the center tap secondary winding 17, the gating winding 52, a gating rectifier 55, the terminal 62, the load resistor 60 and the terminal 61 connected in series.

The biasing means shown schematically in FIG. 1 for the magnetic amplifiers 40 and 50 comprises the bias windings 43 and 53 connected in series between terminal means 20 and 21 for applying a bias voltage $Vb$. The magnitude of the bias voltage $Vb$ is sufficient to cause a bias current to flow in the bias winding 43 and 53 which resets the flux level in the cores 41 and 51 so that when no control current is applied to the control circuit to be described hereinafter, the magnetic amplifiers 40 and 50 will saturate or "fire" at 90°. That is, on a reset half-cycle the bias current will reset the flux level in the respective cores to a point where on the next half-cycle the supply or gating voltage from the transformer 15 will require substantially one-half of a half-cycle or 90° to saturate the respective core.

Although the schematic representation in FIG. 1 of biasing the magnetic amplifiers 40 and 50, is shown as winding means disposed upon the respective cores, other methods well known to those skilled in the art are not excluded. For example, the magnetic amplifiers 40 and 50 may also be biased to fire at 90° by the connection of resistors of a predetermined value in shunt with each of the gating rectifiers 45 and 55. This method as well as other methods are commonly used by those skilled in the art.

The control circuit for the magnetic amplifiers 40 and 50 is shown in FIG. 1 as a series circuit including the control windings 44 and 54 and a current limiting resistor 12 connected between terminal means 10 and 11 to which a control voltage Vc is to be applied. Again, although the control circuit is shown as a series circuit with separate windings disposed on each of the cores 41 and 51 there are other methods well known to those skilled in the art for applying the desired control signal and accomplishing flux level change in the magnetic amplifiers 40 and 50 that are well known to those skilled in the art.

The flip-flop 80 comprises a pair of three electrode transistor devices 81 and 91. The transistor 81 comprises a semi-conductive body having an emitter electrode 82, a collector electrode 83 and a base electrode 84. The transistor 91 comprises a semi-conductive body having an emitter electrode 92, a collector electrode 93 and a base electrode 94. The emitter electrodes 82 and 92 are connected through a resistor 85 to a B+ power supply. The collector electrode 83 is connected through a feedback resistor 86 to the base electrode 94 of the transistor 91. The base electrode 84 is connected to the input terminal 62. The base electrode 94 is connected through a resistor 95 to the B+ power supply. The input terminal 62 is connected through the resistor 60 to the terminal 61 as hereinbefore described. A resistor 71, the terminal 61 and a resistor 72 are connected in series between a B+ supply and ground.

An output transistor 110 for the bistable apparatus comprises a semi-conductive body having an emitter electrode 111, a collector electrode 112, and a base electrode 113. The collector electrode 83 of the transistor 81 is connected through a resistor 114 to the emitter electrode 111 which is also grounded. The collector electrode 93 of the transistor 91 is connected through a resistor 115 to the base electrode 113 of the transistor 110. The base electrode 113 of the transistor 110 is connected through a resistor 116 to a B— power supply. The collector electrode 112 is connected to a first output terminal 120. A second output terminal 121 is connected to the B— supply.

The operation of the apparatus illustrated in FIGURE 1 is as follows. As hereinbefore described, the push-pull amplifier 30 has been biased to fire at 90°. That is, with instantaneous polarities, as shown in FIGURE 1, for the center tap secondary 17 both of the magnetic amplifiers 40 and 50 will fire at 90° and their voltages thereafter produced will oppose each other at the terminals 61 and 62 and thus no output voltage from the amplifier 30 will appear across the output resistor 60. When a very small control voltage with polarity, as shown in FIGURE 1, is applied to the terminals 10 and 11, then the magnetic amplifier 50 will fire just before 90° and the magnetic amplifier 40 will fire just after 90°. As is indicated by the polarity dot markings on the control windings 54 and 44, the magnetic amplifier 50 will be driven slightly more towards positive saturation while the magnetic amplifier 40 will be driven slightly away from positive saturation from the effects of the control sivnal Vc. With the control signal applied as described above, there will then appear a small pulse output on the resistor 60 causing the terminal 62 to be negative and the terminal 61 to be positive.

It is assumed that the flip-flop circuit 80 has been in the "off" condition. That is, the transistor 91 has been conducting and the transistor 81 has been cut off. The voltage dividing network comprising the resistor 71, the terminal 61 and the resistor 72 has applied a bias voltage to the base electrode 84 through the resistor 60 of a proper polarity to keep the transistor 81 biased to non-conduction. However, when the output from the amplifier 30 appears across the resistor 60 as hereinbefore described, it is of the proper polarity and magnitude to bias the transistor 81 to conduction that is towards saturation. This allows conduction in the emitter 82, collector 83 circuit of the transistor 81 which will feedback a signal through the resistor 86 to the base electrode 94 of the transistor 91 which is of the polarity to start driving the transistor 91 towards cut off. As conduction through the emitter 92– collector 93 circuit of the transistor 91 decreases, the potential on the emitter electrode 82 of the transistor 81 rises. This potential rise on the emitter 82 of the transistor 81 effectively raises the bias potential between the emitter 82 and the base electrode 84 of the transistor 81 allowing it to be driven further towards saturation. The two effects just described cooperate to produce a snap action switching operation of the flip-flop element 80.

The abrupt change in the output of the flip-flop element 80 biases or switches the output transistor 110 to conduction. That is, current now flows in a resistor 114 and very little or no current flows through the resistor 115 biasing the transistor 110 to conduction which allows an output to be taken in the path including the B— supply, the output terminals 121 and 120, and the collector 112– emitter 111 circuit of the transistor circuit 110.

When it is desired to change the output states of the flip-flop element 80, that is biasing the output transistor 110 "off," the polarity of the control signal at the terminals 10 and 11 is reversed. This changes the polarity of the output of the push-pull amplifier 30 to the resistor 60, which in turn stops the conduction of the transistor 81 allowing the transistor 91 to conduct in its emitter 92– collector 93 circuit. The embodiment shown in FIGURE 1 has been constructed in the laboratory and has been found to have a one cycle response, to require only $10^{-9}$ watt input power and may take one thousand or more overdrive without malfunction. It responds to a direct current input signal as shown, or an alternating-current input signal of the same frequency as the supply voltage furnished by the transformer 15. For the alternating-current input signal, the device responds to the component of the signal in phase with the supply voltage. Regardless of the type of input signal, the device has a direct-current output.

Referring to FIGURE 2, there is shown a single sided amplifier which may be utilized in the second embodiment of this invention. Since the remainder of the output circuit including the flip-flop element 80 and the output transistor 110 is the same, it has not been shown again in the drawing of FIGURE 2. Only the input terminal 62, the resistor 60, and the bias terminal 61 has been repeated from that of FIGURE 1.

The amplifier 140 is a full wave "center-tap" circuit fed from a saturating transformer 130. The amplifier 140 comprises a magnetic amplifier 150 and a magnetic amplifier 160. The magnetic amplifier 150 comprises a saturable magnetic core 151 having inductively disposed thereon a load or gating winding 152, a control winding 153, and a bias winding 154. The magnetic amplifier 160 comprises a saturable magnetic core 161 having inductively disposed thereon a load or gating winding 162, a control winding 163 and a bias winding 164.

The saturating transformer 130 comprises a saturable magnetic core 131 having a primary winding 132 and a center-tapped secondary winding 133.

The load circuits for the magnetic amplifiers 150 and 160 comprise the respective gating windings 152 and 162 connected in series with respective rectifiers 155 and 165 and respective halves of the center tapped secondary winding 133. The center tap of the secondary winding 133 is connected to the terminal 61 while the junction of the rectifiers 155 and 165 is connected to the terminals 62.

The biasing means for the amplifiers 150 and 160 comprises the bias windings 154 and 164 connected in a series circuit between a pair of bias input terminals 220 and 221. As described for the embodiment of FIGURE 1, the magnetic amplifiers 150 and 160 are to be biased to fire at 90°. Again, this may be done with schematically connected bias windings as shown in FIGURE 2, or with shunt resistors of a predetermined value connected around the gating rectifiers 155 and 165 or any other means well known to those skilled in the art. The control windings 163 and 153 are again shown connected in a series circuit between input control terminals 210 and 211 as was described in FIGURE 1. However again, as explained above, other methods of applying the control signal may be utilized.

The operation of the circuit shown in FIGURE 2 is as follows. The saturating transformer 130 is designed to fire at 90°. That is, voltage will be induced on the center tap secondary winding 133 only for the first 90° of any half-cycle. When the transformer 130 saturates, the resistor 134 in series with the power supply will limit current flow in the winding 132. As described above, the magnetic amplifiers 150 and 160 have also been biased to fire at 90°. Therefore, when there is no control signal applied to the terminals 210 and 211 there is no output to the resistor 60. For a minute quantity of control signal $V_c$ applied to the terminals 210 and 211 of the magnetic amplifiers 150 and 160 will fire before 90° and an output pulse will appear across the resistors 60, with the terminal 61 being positive with respect to the terminal 62. As described above, this type of output on the load resistor 60 changes the output states of the flip-flop 80 and switches the transistor 110 "on."

In this case where an amplifier such as the amplifier 140 with a single sided output is used the transistor flip-flop 80 is reset to the "off" position by another signal to be applied as desired. For example, a signal could be applied to the base electrode 94 of the transistor 92 of the proper polarity and magnitude to start the transistor 91 to conduct. A signal may also be applied to the base electrode 84 of the transistor 81 to stop the conduction of the transistor 81. When it is desired to change the flip-flop element to the "off" state again the control signal $V_c$ must be removed from control terminals 210 and 211.

In conclusion, it is pointed out that while the illustrated examples show practical embodiments of our invention, we do not limit ourselves to the exact details shown, since modification of the same may be varied without departing from the spirit and scope of this invention.

We claim as our invention:

1. A bistable amplifier comprising a magnetic amplifier, a saturable transformer, a coupling means and a flip-flop element having an input means; said saturating transformer having input means for receiving A.C. and output means connected to energize the magnetic amplifier; said magnetic amplifier having two saturable magnetic cores each having inductively disposed thereon a gating winding; said gating windings being connected in circuit relationship with the saturating transformer output means and said coupling means; said coupling means coupling an output from said gating winding to said input means of said flip-flop element; means for biasing each said saturable magnetic core to fire at substantially the same time as said saturating transformer saturates; and means for applying a control signal to said magnetic amplifier which is operative to fire said saturable cores prior to the saturation of said saturating transformer.

2. A bistable amplifier comprising a magnetic amplifier, a saturable transformer, a coupling means and a flip-flop element having an input means; said saturating transformer having input means for receiving A.C. and output means connected to energize the magnetic amplifier; said magnetic amplifier having two saturable magnetic cores each having inductively disposed thereon a gating winding; said gating windings being connected in circuit relationship with the saturating transformer output means and said coupling means; said coupling means coupling an output from said gating winding to said input means of said flip-flop element; means for biasing each said saturable magnetic core to fire at substantially the same time as said saturating transformer saturates; and means for applying a control signal to said magnetic amplifier which is operative to fire said saturable cores prior to the saturation of said saturating transformer; said flip-flop element utilizing semiconductor devices connected in a switching mode.

3. A bistable amplifier comprising a magnetic amplifier; a flip-flop element; said magnetic amplifier having at least two saturable magnetic cores and including a gating winding inductively disposed on each core; means for supplying alternating power to said gating winding; means biasing said cores to fire at the same time; control means for causing one magnetic core to fire before the other magnetic core; and coupling means for comparing the firing angle of each magnetic core and providing said flip-flop element with an input signal responsive to the sequence relation of the firing angles of the magnetic cores.

4. A bistable amplifier comprising a magnetic amplifier; a flip-flop element; said magnetic amplifier having at least two saturable magnetic cores and including a gating winding inductively disposed on each core; means for supplying alternating power to said gating winding; means for biasing each said core to fire at substantially 90°; control means for causing one magnetic core to fire prior to 90° and the other to fire after 90°; and coupling means for comparing the firing angle of each magnetic core and providing said flip-flop element with an input signal during the interval between the firing of the first magnetic core and the firing of the second magnetic core.

5. A bistable amplifier comprising, in combination; a magnetic amplifier having two saturable magnetic cores and including a gating winding inductively disposed on each core; additional winding means inductively disposed on each said core for setting the saturation level of each said core; means for supplying alternating power to said gating windings; circuit means including an impedance element for connecting each gating winding to oppose one another across said impedance element during a predetermined half cycle of the alternating power and providing a first signal thereacross during the interval between the firing of first one core and then the other core and a second signal during the interval between the firing of first said other core and then said one core; and semiconductive means responsive to said first signal for producing a first output which is maintained even though the first signal thereafter is discontinued and responsive to said second signal for removing said first output and producing a second output which is maintained even though the second signal thereafter is discontinued.

6. A bistable amplifier comprising, in combination, a magnetic amplifier having two saturable magnetic cores and including a gating winding inductively disposed on each core; additional winding means inductively disposed on each said core for setting the saturation level of each said core; means for supplying alternating power to said gating windings; circuit means including an impedance element for connecting each gating winding to oppose one another across said impedance element during a predetermined half cycle of the alternating power and providing a first signal thereacross during the interval between the firing of one core and the other core and a second signal during the interval between the firing of said other core and said one core; means for resetting the saturable cores during the opposite half cycle of said alternating power; and semiconductive means responsive to said first signal for producing a first output which is maintained even though the first signal thereafter is discontinued and responsive to said second signal for removing said first output and producing a second output which is maintained even though the second signal thereafter is discontinued.

7. A bistable amplifier comprising, in combination; a magnetic amplifier having two saturable magnetic cores and including a gating widing inductively disposed on each core; additional winding means inductively disposed on each said core for setting the saturation level of each said core; means for supplying alternating power to said gating windings; flip-flop means including input means and having an output state responsive to the last of two conditions; and circuit means for connecting said input means across each said gating winding; one condition being the firing of said first core prior to said second core and the other condition being the firing of said second core prior to said first core.

8. A bistable amplifier comprising, in combination; a magnetic amplifier having two saturable magnetic cores and including a gating winding inductively disposed on each core; additional winding means inductively disposed on each said core for setting the saturation level of each said core; means for supplying alternating power to said gating windings; flip-flop means having two output states and including input means and output means for providing an output state dependent on the last of a plurality of input signals to said input means; and circuit means for connecting said input means across each said gating winding; and rectifier means poled to allow conduction through said gate windings in opposition to each other across said input means, whereby an input signal results whenever conduction through one of said gate windings is unopposed..

9. A bistable amplifier comprising, in combination; a magnetic amplifier having two saturable magnetic cores and including a gating winding inductively disposed on each core; additional winding means inductively disposed on each said core for setting the saturation level of each said core; means for connecting an alternating power source to said gating windings; means for varying the sequence of the firing of said cores for a predetermined half cycle of the power source; static switching means including input means responsive to a first input signal for producing an output which is maintained even though said first input signal thereafter is discontinued and responsive to a second input signal for resetting said static switching means and terminating said output; circuit means for connecting said input means across each said gating winding; and rectifier means poled to allow conduction through said gate windings in opposition to each other across said input means, whereby an input signal results whenever conduction through one of said gates windings is unopposed.

10. A bistable amplifier comprising, in combination; a magnetic amplifier having two saturable magnetic cores and including a gating winding inductively disposed on each core; means for connecting an alternating power source to said gating windings; semiconductive flip-flop means having an output dependent on the last of a plurality of inputs supplied to the semiconductive flip-flop means and which retains the output corresponding to the last input; means for biasing said semiconductive flip-flop means to a predetermined output state; means for establishing the sequence of the firing of said cores for a predetermined half cycle of the power source; means for resetting said cores during the opposite half cycle of the power source; and means for comparing the sequence of the firing of said cores during said predetermined half cycle and providing an input to said semiconductive flip-flop means responsive to the sequence of firing of said cores whereby said biasing means for said flip-flop is rendered inoperative when a predetermined sequence of firing of said cores occurs.

11. A bistable amplifier comprising a magnetic amplifier having a power input circuit for receiving A.C. to energize said amplifier, said magnetic amplifier having first and second saturable magnetic cores each having inductively disposed thereon a gating winding, means for firing said cores during the same half cycle of A.C. supplied to said input circuit, each core being adapted when fired to produce an output in its associated gating winding, coupling means for combining the outputs of said gate windings in opposition to produce a resultant output pulse in response to sequential firing of said cores during the same half cycle of said A.C., and a flip-flop connected to said coupling means, said flip-flop being operable to assume a stable state in response to said output pulse.

12. A bistable amplifier comprising a magnetic amplifier having a power input circuit for receiving A.C. to energize said amplifier, said magnetic amplifier having first and second saturable magnetic cores each having inductively disposed thereon a gating winding, means normally biasing said cores to fire at the same time during a predetermined half cycle of said A.C., control means responsive to input signals for affecting said cores in opposite magnetic sense in response to an input signal, whereby said cores are sequentially fired during the same half cycle in response to said input signal, each core being adapted when fired to produce an output in its associated gating winding, coupling means for combining the outputs of said gate windings in opposition to produce a resultant output pulse in response to sequential firing of said cores during the same half cycle of said A.C., and a flip-flop connected to said coupling means, said flip-flop being operable to assume a stable state in response to said output pulse.

13. The combination of claim 12 wherein said cores are normally biased to fire at 90° in said half cycle of A.C.

14. The combination of claim 12 wherein said flip-flop comprises semiconductive switching means.

15. A bistable amplifier comprising a magnetic amplifier having a power input circuit for receiving A.C. to energize said amplifier, said magnetic amplifier having first and second saturable magnetic cores each having inductively disposed thereon a gating winding, means normally biasing said cores to fire at the same time during a predetermined half cycle of said A.C., and control means responsive to input signals for affecting said cores in opposite magnetic sense in response to an input signal to sequentially fire said cores during the same half cycle in response to said input signal, the firing sequence being dependent on the polarity of the input signal, each core being adapted when fired to produce an output in its associated gating winding, coupling means for combining the outputs of said gate windings in opposition to produce a resultant output pulse in response to sequential firing of said cores during the same half cycle of said A.C., and a flip-flop connected to said coupling means to respond to said output pulses, said flip-flop being operable to assume one of its stable states in response to an output pulse of one polarity, and the other of its stable states in response to an output pulse of the opposite polarity.

16. A bistable amplifier comprising a magnetic amplifier having a power input circuit for receiving A.C. to energize said amplifier, said magnetic amplifier having first and second saturable magnetic cores each having inductively disposed thereon a gating winding, means for normally biasing said cores to fire at the same time during a predetermined half cycle of said A.C., and control means responsive to input signals for affecting said cores in opposite magnetic sense in response to an input signal of any given polarity, whereby said cores are sequentially fired during the same half cycle in response to said input signal, each core being adapted when fired to produce an output in its associated gating winding, coupling means for combining the outputs of said gate windings in opposition to produce a resultant output pulse in response to sequential firing of said cores during the same half cycle of said A.C., and switch means connected to said coupling means, said switch means being operable to assume a switching mode in response to said output pulse.

17. A bistable amplifier comprising first and second saturable magnetic devices, each having a core with a winding thereon, means for energizing said devices in response to the receipt of A.C., circuit means including said windings for producing a pulse in response to sequential firing of said devices during the same half cycle of said A.C., said pulse beginning with the firing of the first fired device and ending with the firing of the second fired device, said devices being arranged to normally fire at the same time, control means for sequentially firing said devices during the same half wave of said A.C. in response to a control signal, and trigger means coupled to said circuit means and having a stable state which it assumes in response to said pulse.

References Cited in the file of this patent

UNITED STATES PATENTS

| | | |
|---|---|---|
| 2,555,999 | Ringlee | June 5, 1951 |
| 2,809,303 | Collins | Oct. 8, 1957 |
| 2,871,441 | Baker | Jan. 27, 1959 |
| 2,909,675 | Edson | Oct. 20, 1959 |
| 2,956,233 | Reap | Oct. 11, 1960 |